US 7,873,039 B2

(12) United States Patent
Tal et al.

(10) Patent No.: US 7,873,039 B2
(45) Date of Patent: Jan. 18, 2011

(54) ENHANCED OPTICAL LINE TERMINAL CONTROLLER

(75) Inventors: Doron Tal, Kfar Shmaryahu (IL); Gil Levy, Herzliya (IL); Gal Sitton, Netanya (IL)

(73) Assignee: Broadlight Ltd., Herzliya (IL)

( * ) Notice: Subject to any disclaimer, the term of this patent is extended or adjusted under 35 U.S.C. 154(b) by 815 days.

(21) Appl. No.: 11/812,134

(22) Filed: Jun. 15, 2007

(65) Prior Publication Data

US 2008/0002976 A1 Jan. 3, 2008

Related U.S. Application Data

(60) Provisional application No. 60/817,097, filed on Jun. 29, 2006.

(51) Int. Cl.
*H04L 12/46* (2006.01)

(52) U.S. Cl. .................. 370/389; 370/392; 370/401; 370/466

(58) Field of Classification Search .................. 370/389, 370/392, 400, 401, 465, 466, 469; 709/245
See application file for complete search history.

(56) References Cited

U.S. PATENT DOCUMENTS

| | | | |
|---|---|---|---|
| 5,930,018 A | 7/1999 | Effenberger | |
| 6,967,949 B2 * | 11/2005 | Davis et al. | 370/390 |
| 7,443,850 B2 * | 10/2008 | Boyd et al. | 370/389 |
| 2002/0034178 A1 * | 3/2002 | Schmidt et al. | 370/386 |
| 2003/0091045 A1 | 5/2003 | Choi et al. | |
| 2003/0235205 A1 | 12/2003 | Song et al. | |
| 2003/0236916 A1 * | 12/2003 | Adcox et al. | 709/245 |
| 2004/0057431 A1 * | 3/2004 | Song et al. | 370/390 |
| 2004/0109450 A1 * | 6/2004 | Kang et al. | 370/390 |
| 2004/0120326 A1 | 6/2004 | Yoon et al. | |
| 2004/0196862 A1 | 10/2004 | Song et al. | |
| 2005/0129030 A1 * | 6/2005 | Choi et al. | 370/395.53 |
| 2005/0158048 A1 | 7/2005 | Sung et al. | |
| 2006/0098632 A1 | 5/2006 | Johnson | |
| 2007/0223490 A1 * | 9/2007 | Mizutani et al. | 370/395.6 |

* cited by examiner

*Primary Examiner*—Pankaj Kumar
*Assistant Examiner*—Duc T Duong
(74) *Attorney, Agent, or Firm*—Myers Wolin LLC

(57) ABSTRACT

An enhanced optical line terminal (OLT) controller capable of providing traffic processing features. The OLT controller comprises an Ethernet switch operable in a stacking mode and being capable of mapping between Ethernet addresses and passive optical network (PON) addresses. The Ethernet switch is connected to a PON medium access control (MAC) adapter via a stacking port and being capable of processing Ethernet frames relayed on the PON network. The mapping information is kept by the Ethernet switch in a forwarding table.

16 Claims, 4 Drawing Sheets

ENHANCED OPTICAL LINE TERMINAL CONTROLLER

CROSS-REFERENCE TO RELATED APPLICATION

This application claims priority from U.S. provisional patent No. 60/817,097 filed on Jun. 29, 2006, whose contents are wholly incorporated herein by reference.

REFERENCES CITED

Patents

| | | |
|---|---|---|
| U.S. Pat. No. 5,930,018 | Effenberger | July 1999 |
| U.S. Pat. No. 20030091045 | Choi, et al. | May 2003 |
| U.S. Pat. No. 20040120326 | Yoon, et al. | June 2004 |
| U.S. Pat. No. 20040196862 | Song, et al. | October 2004 |
| U.S. Pat. No. 20050158048 | Sung, et al. | July 2005 |
| U.S. Pat. No. 20030235205 | Song; et al. | December 2003 |
| U.S. Pat. No. 20060098632 | Johnson | May 2006 |

FIELD OF THE INVENTION

The present invention relates generally to passive optical networks (PONs), and more specifically to optical line terminal (OLT) connected in the PONs.

BACKGROUND OF THE INVENTION

As the demand of users for bandwidth is rapidly increasing, optical transmission systems, where subscriber traffic is transmitted using optical networks, are installed to serve this demand. These networks are typically referred to as fiber-to-the-curb (FTTC), fiber-to-the-building (FTTB), fiber-to-the-premise (FTTP), or fiber-to-the-home (FTTH). Each such network provides access from a central office (CO) to a building, or a home, via optical fibers installed near or up to the subscribers' locations. As the transmission quantity of such an optical cable is much greater than the bandwidth actually required by each subscriber, a passive optical network (PON) shared between a plurality of subscribers through a splitter was developed.

A diagram of a typical PON 100 is schematically shown in FIG. 1. The PON 100 includes M optical network units (ONUs) 120-1, 120-2, through 120-M, coupled to an optical line terminal (OLT) 130 via a passive optical splitter 140. To the extent that reference is made to the ONUs without regard to a specific one thereof, such ONUs will be referenced as 120. Traffic data transmission may be achieved, for example, by using asynchronous transfer mode (ATM) cells over two optical wavelengths, one for the downstream direction and another for the upstream direction. In downstream transmission, the OLT 130 receives data from a backbone network 160 and distributes the data into each ONU 120 through the splitter 140. For this purpose, the OLT 130 performs a switching function on medium access control (MAC) address of at least layer 2. Each ONU 120 filters its respective data according to, for example, a pre-assigned unique value. The ONUs 120 transmit respective data to the OLT 130 during different time slots allocated by the OLT 130 for each ONU 120. The splitter 140 splits a single line into multiple lines, for example 1 to 32.

FIG. 2 shows a schematic block diagram of the OLT 130 that includes an optical transceiver 210 and an OLT controller 220. The optical transceiver 210 acts to transmit and receive optical signals to and from the ONUs 120 via the optical splitter 140. The OLT controller 220 acts to process signals received from ONUs 120 and the backbone network 160. Specifically, the controller 220 includes an Ethernet switch 230 and a PON MAC adapter 240. The Ethernet switch 230 merely provides an interface to the backbone network 160. Ethernet packets received at the Ethernet switch 230 are sent to the PON MAC controller 240, which in turn processes the frames to generate PON frames. Abstractly, the PON MAC adapter 240 adapts between the Ethernet domain and the PON domain. That is, the PON MAC adapter 240 constructs PON frames from the Ethernet packets. Each PON frame includes a unique value (e.g., a port ID) which designates the destination ONU.

Currently, the mapping between Ethernet addresses and port-IDs as performed by conventional OLTs is based on virtual local area network (VLAN) tags included in Ethernet packets and not on MAC destination addresses of the packets. This limits the functionality of the Ethernet switch 230 as conventional switches are capable of supporting MAC address learning and providing enhanced traffic management features based on the learnt addresses. One technique to map between Ethernet MAC and port-ID using VLAN includes adding a dedicated logic circuit (e.g., FPGA) to the OLT controller 220. This increases the complexity and the cost of OLT controllers. Another technique for enabling the mapping between Ethernet and PON addresses includes manually configuring the Ethernet switch 230 with rules that define the routing information. Specifically, the rules are configured to mapping an Ethernet address to a port-ID and inserting the port-ID value in a VLAN tag.

However, the number of rules is bounded and cannot cover the entire PON address space. In addition, adding a VLAN tag by the Ethernet switch 230 prevents a VLAN manipulation by the Ethernet switch. This is a major drawback as in many cases a downstream packet has to be transmitted towards the PON with a VLAN value different than the received VLAN value.

It would be therefore advantageous to provide an efficient solution for mapping addresses between Ethernet domain and PON domain by OLT controllers.

SUMMARY OF THE INVENTION

In accordance with a first aspect, the invention provides an optical line terminal (OLT) controller capable of providing enhanced traffic processing features, the OLT comprising:

an Ethernet switch operable in a stacking mode and being capable of mapping between Ethernet addresses and passive optical network (PON) addresses; and a PON medium access control (MAC) adapter connected to the Ethernet switch via a stacking port and capable of processing Ethernet frames relayed on the PON network.

In accordance with a second aspect, the invention provides a method for providing enhanced traffic processing features by an optical line terminal (OLT) controller, the method comprising:

generating a stacking tag based on mapping between Ethernet addresses and passive optical network (PON) addresses; and constructing downstream frames compliant with the PON using address information encapsulated in the stacking tag.

BRIEF DESCRIPTION OF THE DRAWINGS

In order to understand the invention and to see how it may be carried out in practice, some embodiments will flow be described, by way of non-limiting example only, with reference to the accompanying drawings, in which.

DETAILED DESCRIPTION OF EMBODIMENTS

An embodiment of the present invention discloses an enhanced optical line terminal (OLT) controller capable of providing traffic processing features. The OLT controller comprises an Ethernet switch operable in a stacking mode and being capable of mapping between Ethernet addresses and passive optical network (PON) addresses. The Ethernet switch is connected to a PON medium access control (MAC) adapter via a stacking port and being capable of processing Ethernet frames relayed on the PON network. The mapping information is kept by the Ethernet switch in a forwarding table.

Figure 1:
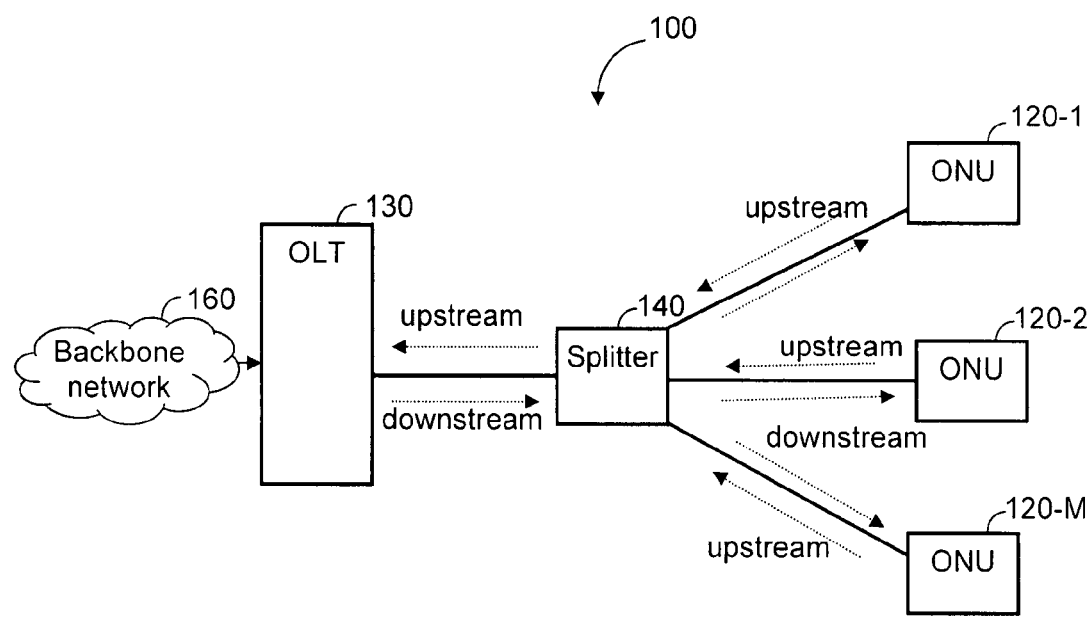
FIG. 1 is a diagram of a typical prior art PON.
Figure 2:
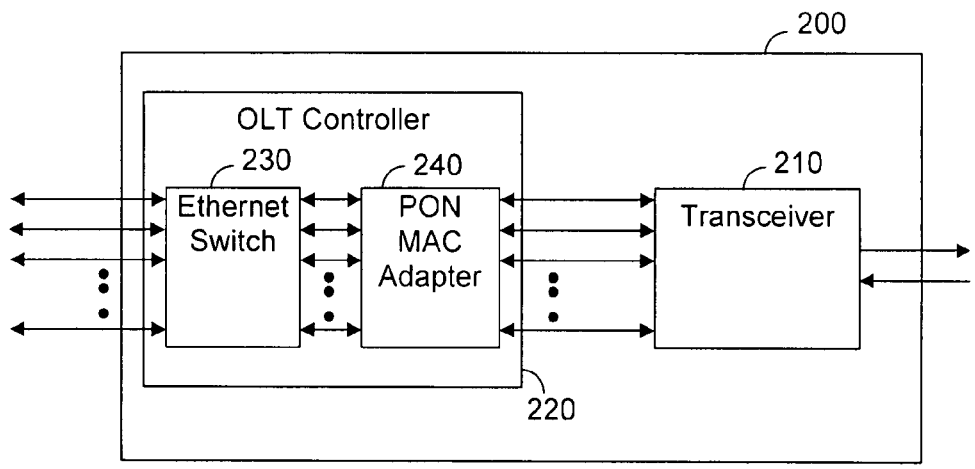
FIG. 2 is a schematic block diagram of a prior art OLT.
Figure 3:
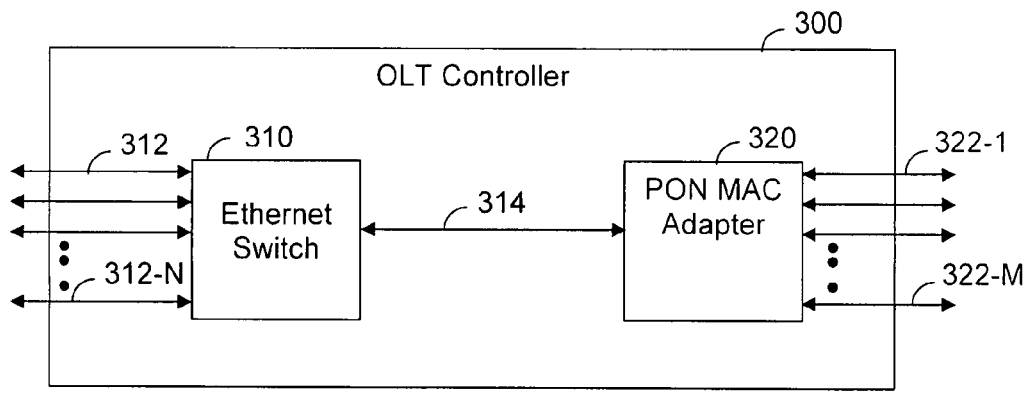
FIG. 3 is a block diagram of an enhanced OLT controller disclosed according to one embodiment of the present invention.
Figure 4A:
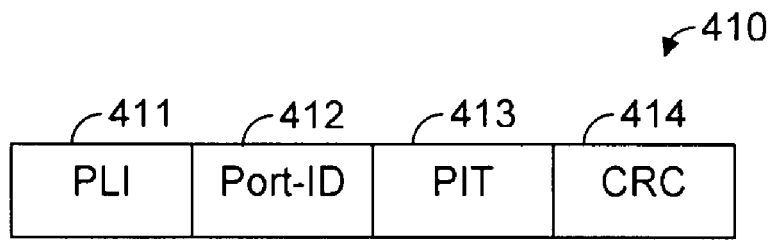
FIGS. 4a to 4d are schematic diagrams of a GEM header, a stacking tag, an upstream Ethernet packet header, and a downstream Ethernet packet header.

FIG. 3 is a block diagram showing the functionality of an OLT controller 300 disclosed according to one non-limiting embodiment of the present invention. The OLT controller 300 includes an Ethernet switch 310 having a plurality of input ports 312-1 through 312-N and a stacking port 314 connected to a PON MAC adapter 320. The PON MAC adapter 320 communicates with the ONUs 120 via a plurality of ports 322-1 through 322-M. Each port 322 is mapped to an address designated by a port-ID. The main function of the adapter 320 is to construct downstream frames compliant with at least the Gigabit PON (GPON) or Ethernet PON (EPON) standards. As illustrated in FIG. 4a, a GEM header 410 of a GPON downstream frame comprises at least the fields: a payload length indicator (PLI) 411 used for delineation, a port-ID 412, a payload type indicator (PTI) 413, and a cyclic redundancy check (CRC) 414. In addition, the CRC is computed over the PLI, port-ID, and PTI values and inserted in field 414. In addition, the PON MAC adapter 320 reconstructs upstream Ethernet packets from PON frames originated at ONUs 120.

Other embodiments of the OLT controller 300 may likewise be employed where the Ethernet switch 320 is replaced by a network processor, a custom ASIC, or any aggregation device supporting custom or proprietary tags (e.g., stacking tags).

Figure 4B:
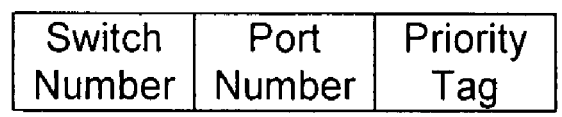

The stacking tag is sent from the Ethernet switch 310 which is configured to operate in a stacking mode. Generally, stacking is the connection of two or more component Ethernet switches that may optionally be resident in the same chassis so that they behave as a single composite switch. As shown in FIG. 4b, a stacking tag 420 includes a switch number, a port number and preferably a priority tag. The combination of switch and port numbers determines the port-ID. Therefore, to encapsulate the GEM header 410 includes extracting the switch and port numbers from the stacking tag, computing the port-ID as a function of these numbers, and inserting the port-ID in the field 411. The priority tag defines the quality of service (QoS) assured to customer equipment (CPE) connected to an ONU 120.

Figure 4C:
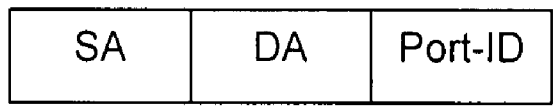
Figure 5:
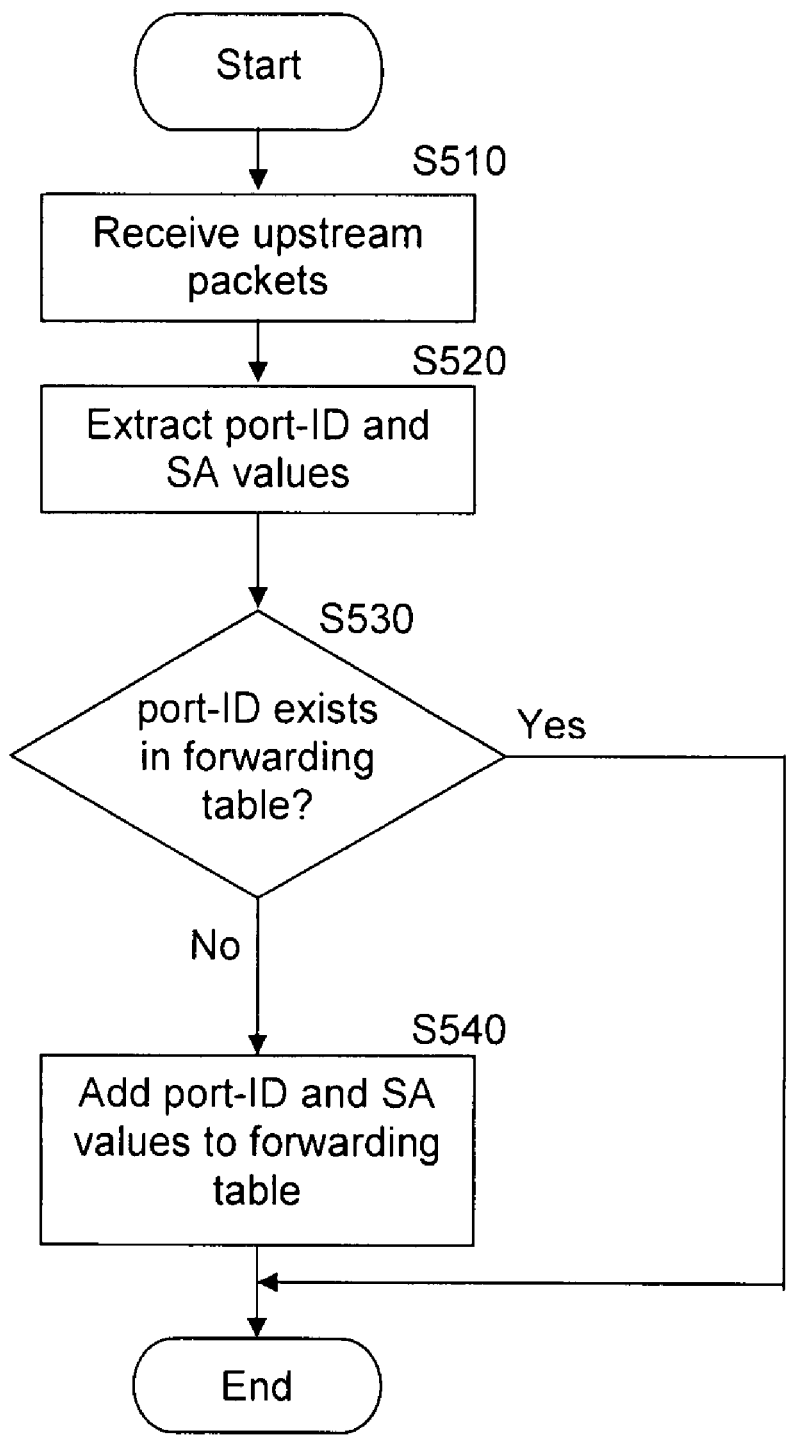
FIG. 5 is a flowchart describing the process for learning the association between MAC addresses and port-IDs according to one embodiment of the present invention.

As opposed to hitherto-proposed OLT controllers the mapping between Ethernet addresses (e.g., MAC address, VLAN tag, etc.) and port-IDs is based on the MAC destination address of incoming Ethernet packets. With this aim, the Ethernet switch 310 learns port-IDs of PON frames. The learning process will be better understood with respect to FIG. 5. At S510, an upstream Ethernet packet is received at the Ethernet switch 310. As depicted in FIG. 4c, a header 430 of an upstream Ethernet packet includes at least a MAC source address (SA), i.e., the address of a source CPE of an ONU, a MAC destination address (DA), i.e., the address of a destination terminal in a backbone network, and a port-ID, i.e., the ID of the source ONU. For simplicity of the description, other fields that may be included in header 430 are not shown. At S520, the port-ID and SA values are extracted from the received packet. At S530, a check is made to determine if the port-ID is included in a forwarding table maintained by the Ethernet switch. The forwarding table includes mapping information between MAC address of each CPE and a port-ID value. It should be emphasized that the extract port-ID is derived from a switch and port numbers.

In one embodiment of the present invention the forwarding table may also include a priority tag that defines the QoS ensured for a respective CPE. If S530 results with an affirmative answer, execution terminates; otherwise, at S540, a new entry is allocated in the forwarding table and the extracted MAC address and port-ID are saved in the table. It should be noted that a single MAC address may have multiple port-IDs associated with it. It should also be noted that no new database is required in the Ethernet switch to maintain the forwarding table, as the present invention utilizes databases that in any case exist in conventional Ethernet switches to keep the mapping information.

Figure 4D:
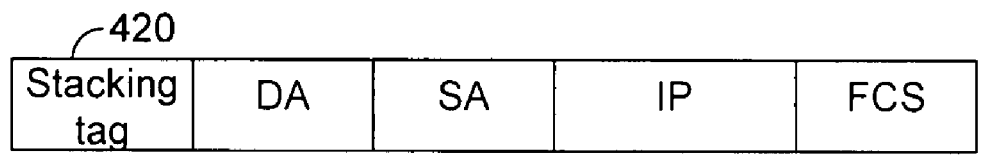

In the downstream direction, the Ethernet switch maps between the DA of an incoming Ethernet packet, generates the stacking tag, and appends the tag to the packet's header. Specifically, the Ethernet switch 310 extracts the DA from the packet's header. Then, the switch 310 searches in the forwarding table a MAC address that matches the DA, and once such an address is found, its respective port-ID is retrieved. From the port-ID the switch number and port number are derived and inserted to the stacking tag 420. If the entry of the port-ID also includes a priority tag, then this tag may also be added to the tag 420. Subsequently, the stacking tag is attached to a header of an incoming Ethernet packet. As shown in FIG. 4d, the modified Ethernet header 440 includes a stacking tag 420, a MAC DA, a MAC SA, an Internet protocol (IP) address, and a frame check sequence (FCS). For simplicity of the description other fields that may be included in header 440 are not shown. The Ethernet packet including the header 430 is sent to the PON MAC adapter 320 over the stacking port 314.

It should be appreciated by a person skilled in the art that the ability to map addresses from Ethernet domain to the GPON domain allows the Ethernet switch to provide enhanced traffic processing features including, but not limited to, aggregation of multiple PON flows, Ethernet QoS, rate limitation, packets multicasting, and so oil. Specifically, the rate limitation allows controlling the amount of bandwidth that ingress the output ports 322. It further allows enforcing downstream traffic rates, per ONU, according to a predefined service level agreement (SLA). The Ethernet switch 310 replicates multicast traffic on its stacking port 314, i.e., creates a copy for each relevant port 322. The switch 310 forwards the multicast traffic, identified by the multicast group to the PON MAC adapter 320, which correlates between multicast group of packets to its corresponding multicast port ID.

In a specific embodiment, the OLT controller disclosed herein is applicable to operate in conjunction with the GPON and EPON standards. When operating in a GPON mode, the PON MAC adapter encapsulates the port-ID into a port-ID field in a GEM header (shown in FIG. 4a). When the OLT is configured to operate in an EPON mode the PON MAC adapter 320 encapsulates Ethernet packets within frames compliant with the EPON standards. In particular, a logical link ID (LLID) is derived from the switch and port number in the stacking tag and inserted in a LLID field in a preamble of a header of an EPON frame.

The invention claimed is:

1. An optical line terminal (OLT) controller capable of providing enhanced traffic processing features, the OLT comprising:
    an Ethernet switch operable in a stacking mode and being capable of mapping between Ethernet addresses and passive optical network (PON) addresses and for generating a stacking tag based on the mapping, wherein the stacking tag includes a switch number and a port number, the mapping results in mapping information that includes the association between MAC destination addresses and least one of port-IDs, and logical link IDs (LLIDs), wherein the port-ID and the LLID are determined using switch number and the port number; and
    a PON medium access control (MAC) adapter connected to the Ethernet switch via a stacking port and capable of processing Ethernet frames relayed on the PON network.

2. The OLT of claim 1, wherein the Ethernet switch maintains mapping information of mapping between Ethernet addresses and PON addresses in a forwarding table.

3. The OLT of claim 2, wherein at least one of: the LLIDs, the port-IDs are encapsulated in a stacking tag.

4. The OLT of claim 3, wherein the stacking tag further includes a priority tag that defines a quality of service (QoS) assured to customer equipment (CPE) connected to an ONU.

5. The OLT of claim 1, wherein the PON comprises at least one of: a Gigabit PON (GPON), an Ethernet PON (EPON).

6. The OLT of claim 1, wherein the enhanced traffic processing features comprise at least one of: aggregation of multiple PON flows, Ethernet QoS, rate limitation, packets multicasting.

7. A method for providing enhanced traffic processing features by an optical line terminal (OLT) controller, the method comprising:
    generating a stacking tag based on mapping between Ethernet addresses and passive optical network (PON) addresses, wherein the stacking tag includes a switch number and a port number; and
    constructing downstream frames compliant with the PON using address information encapsulated in the stacking tag by:
        extracting the switch number and the port number from the stacking tag;
        determining a port-ID using the switch number and the port number; and
        inserting the port-ID to a header field of a downstream frame.

8. The method of claim 7, wherein mapping information of mapping between Ethernet addresses and PON addresses comprises at least one of: the association between medium access (MAC) destination addresses and port-IDs, the association between MAC destination addresses and logical link IDs (LLIDs).

9. The method of claim 8, wherein constructing the downstream frames further comprises:
    extracting the switch number and the port number from the stacking tag;
    determining a LLID using the switch number and the port number; and
    inserting the LLID to a header field of a downstream frame.

10. The method of claim 8, wherein the stacking tag further includes a priority tag that defines a quality of service (QoS) assured to customer equipment (CPE) connected to an optical network unit (ONU).

11. The method of claim 8, further comprising learning at least one of port-IDs or LLIDs associated with the PON addresses.

12. The method of claim 11, wherein learning at least one of port-IDs or LLIDs associated with the PON addresses comprises:
    receiving an upstream packet;
    extracting a port-ID and an Ethernet source address from the upstream packet;
    determining if the port-ID is included in a forwarding table; and
    when a respective entry is not found in the forwarding table, inserting the port-ID together with the Ethernet source address to an entry in the forwarding table.

13. The method of claim 12, wherein the forwarding table includes mapping information between MAC address of each CPE and a port-ID value.

14. The method of claim 13, wherein the port-ID comprises a LLID.

15. The method of claim 7, wherein the PON comprises at least one of: a Gigabit PON (GPON), an Ethernet PON (EPON).

16. The method of claim 7, wherein the enhanced traffic processing features comprise at least one of: aggregation of multiple PON flows, Ethernet QoS, rate limitation, packets multicasting.

* * * * *